M. CARR.
DRAFT GEAR.
APPLICATION FILED NOV. 19, 1907.
946,994.
Patented Jan. 18, 1910.
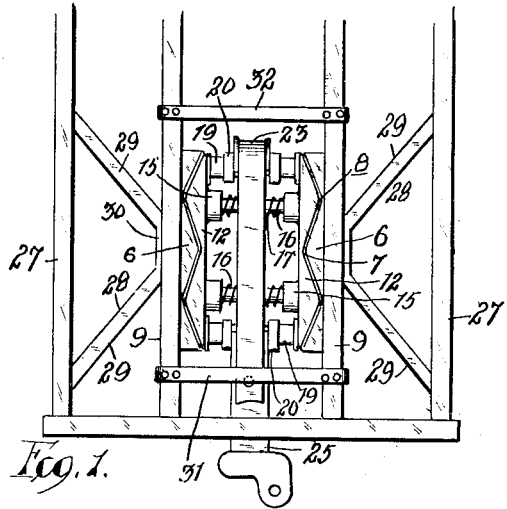
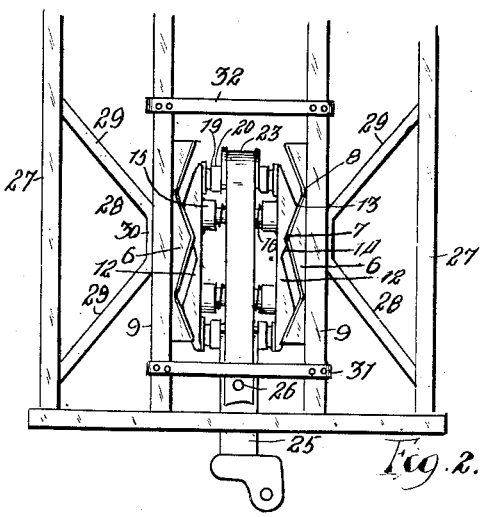
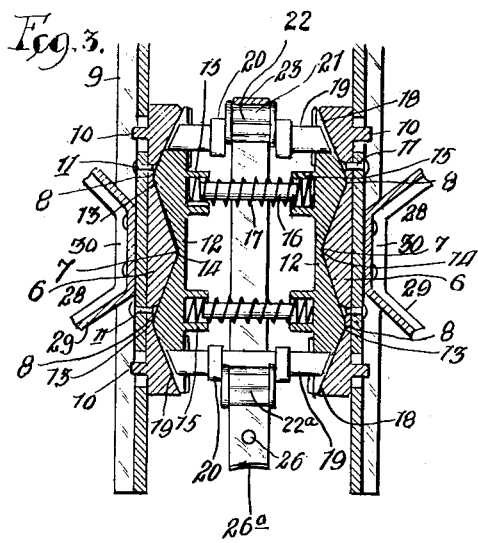
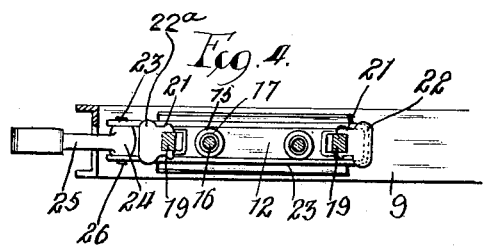
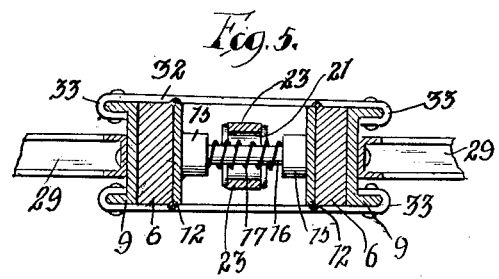
Witnesses:
Wm P. Bond
Pierson W. Banning
Inventor:
Matthew Carr
by Banning & Banning
Attys.

UNITED STATES PATENT OFFICE.

MATTHEW CARR, OF CHICAGO, ILLINOIS.

DRAFT-GEAR.

946,994.

Specification of Letters Patent. Patented Jan. 18, 1910.

Application filed November 19, 1907. Serial No. 402,794.

*To all whom it may concern:*

Be it known that I, MATTHEW CARR, a citizen of the United States, residing at Chicago, in the county of Cook and State of Illinois, have invented certain new and useful Improvements in Draft-Gears, of which the following is a specification.

This invention relates to draft gears for railroad cars; and has for its object to so construct and mount the gear between the sills of the car floor that the strain put upon the sills by the action of the gear under onerous condition of usage will be more evenly distributed than has generally been the practice in mechanism of this kind.

The invention consists in the features of construction and combination of parts hereinafter described and claimed.

In the drawings, Figure 1 is a plan view of the gear in normal position; Fig. 2 a similar view of the gear under tension; Fig. 3 a plan view partly in section of the same with draw bar removed in normal position; Fig. 4 a sectional elevation of the same; and Fig. 5 a cross sectional view of the same.

The gear consists of fixed friction plates 6 of undulating contour on their inner faces, having ridges 7 and depressions 8, as shown. The fixed friction plates are flat on their outer faces, which faces lie against and are rigidly attached to the inner sills 9 of the car body. In order to afford a more rigid mounting for the friction plates, the latter are provided with outwardly extending dowel pins 10, which pass through the sills and hold the plates against displacement. Additional means of attachment, as bolts 11, are also provided, which insures a rigid and firm connection for the parts.

The fixed friction plates coöperate with movable friction plates 12, which are located inside of the fixed plates and have an outer configuration coincident with the configuration of the fixed friction plates, the ridges 13 of the movable plates coinciding with the depressions 8 of the fixed plates, and the depressions 14 of the movable plates coinciding with the ridges 7 of the fixed plates. Each of the movable plates has, on its rear wall, two sockets 15, into which are entered the ends of a pair of tubular stops 16, which are intended to limit the inward retraction of the movable plates. The tubular stops are encircled by coil springs 17, which normally serve to distend the movable friction plates and hold them in contact and register with the fixed friction plates.

Each of the movable plates is provided, at each end, with an inwardly extending slot or recess 18 cut completely through the end, into which recesses are loosely entered cross bars 19, provided with lugs 20, suitably spaced to receive the jaws 21 of bearing heads 22 and 22ª. The bearing heads, at opposite ends of the gearing, are of uniform formation and provide mountings for the U-shaped strap 23 which passes around the rear bearing head 22, and is connected with the head 24 of a draw bar 25. The head 24 is pivoted between the ends of the strap by means of a pin or bolt 26, and is of slightly rounded formation to permit the slight swing or movement necessary in the use of the draft mechanism. The ends of the strap are inwardly bent or turned to form flanges 26ª, which embrace the outer side of the head 24, which is thus held in position and in contact with the forward bearing head 22.

The inner sills 9 of the car coöperate with outer sills 27, and between the inner and outer sills, on each side of the draft gear, is a brace 28 of truss formation, comprising diagonally extending side arms 29 and a connecting head 30. The structure is further reinforced by upper and lower forward tie bars 31 and upper and lower rear tie bars 32, which tie bars are provided with hooked ends 33, which engage the flanges of the inner sills which are preferably of channel formation.

In use, when the gear mechanism is subjected either to a pull or a thrust, the action of the sloping frictional surfaces of the fixed and movable friction plates tend to retract the movable plates against the tension of the coil springs, the movable frictional plates being moved forward or back, depending upon the direction of the strain. Fig. 2 shows the gearing subjected to a pull which has moved the movable frictional plates forward and compressed the springs accordingly. When subjected to a forward pull, the strap engages the rear bearing head 22, which in turn engages the rear cross bar 19, which thereby imparts a forward movement to the two movable friction plates. The tendency of this movement will be to spread the inner sills to which the gear is attached, and this tendency will be counteracted and the strain distributed by the provision of the truss structure which connects the inner and outer sills. The tie bars 32, moreover, serve to counteract this tendency, so that the strain will be equally distributed instead of centered against the inner sills, which has frequently been the practice in previous constructions.

What I regard as new and desire to secure by Letters Patent is:

1. In draft mechanism, the combination of inner and outer sills, braces between the two sills converging toward and attached to the inner sills, longitudinally extending fixed friction plates secured to the inner sides of the inner sills opposite the points of attachment for the braces, movable friction plates intermediate the fixed friction plates, a draw bar, a connection between the draw bar and the movable friction plates for moving the same in either direction, and springs interposed between the movable friction plates for normally extending them, substantially as described.

2. In draft mechanism, the combination of a pair of sills, longitudinally extending fixed friction plates having undulating surfaces and secured to the inner faces of the sills, movable friction plates having undulating surfaces and located intermediate the fixed friction plates, and provided, in their ends, with recesses, cross bars loosely entered within the recesses, a strap embracing the cross bars and adapted to be moved in either direction for actuating the cross bars, and springs interposed between the movable friction plates for normally distending them, substantially as described.

3. In draft mechanism, the combination of a pair of longitudinally extending sills, longitudinally extending fixed friction plates secured to the inner faces of the sills and having undulating surfaces, movable friction plates intermediate the fixed friction plates and having undulating friction surfaces, and provided, in their ends, with recesses, cross bars loosely entered into such recesses, a draw bar, a yoke embracing the cross bars and adapted to be moved by the draw bar, springs interposed between the movable friction plates for normally distending them, and stops for limiting the compression of the springs, substantially as described.

4. In a draft mechanism, the combination, with relatively immovable oppositely disposed friction plates, having on their inner faces undulating friction surfaces, and securely attached to the body of the car, of movable friction plates intermediate the fixed friction plates, and having on their outer faces undulating surfaces adapted to register with and slide on the fixed friction surfaces, springs interposed between the movable friction plates for normally distending them, a drawbar, and a connection between the drawbar and the movable friction plates for moving the same in either direction, substantially as described.

MATTHEW CARR.

Witnesses:
WALKER BANNING,
PIERSON W. BANNING.